(12) United States Patent
Vest et al.

(10) Patent No.: US 8,815,995 B2
(45) Date of Patent: Aug. 26, 2014

(54) TIRE TREAD WITH RESIN

(75) Inventors: Gary W. Vest, Simpsonville, SC (US); Claudine Veas, Travelers Rest, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 736 days.

(21) Appl. No.: 12/593,649

(22) PCT Filed: Mar. 29, 2007

(86) PCT No.: PCT/US2007/065460
§ 371 (c)(1), (2), (4) Date: Mar. 24, 2010

(87) PCT Pub. No.: WO2008/121139
PCT Pub. Date: Oct. 9, 2008

(65) Prior Publication Data
US 2010/0179247 A1 Jul. 15, 2010

(51) Int. Cl.
*B60C 1/00* (2006.01)
*C08L 21/00* (2006.01)
*C08L 93/00* (2006.01)
*C08K 5/01* (2006.01)
*C08L 91/00* (2006.01)

(52) U.S. Cl.
CPC ............ *B60C 1/0016* (2013.01); *C08L 21/00* (2013.01); *C08L 93/00* (2013.01); *C08K 5/01* (2013.01); *C08L 91/00* (2013.01)
USPC ....................................... 524/492

(58) Field of Classification Search
CPC ............................. B60C 1/0016; C08L 21/00
USPC ....................................... 524/492
See application file for complete search history.

(56) References Cited

U.S. PATENT DOCUMENTS

| 3,927,144 A | 12/1975 | Hayashi et al. |
| 6,221,953 B1 | 4/2001 | Sandstrom et al. |
| 6,405,775 B1 | 6/2002 | Maly et al. |
| 6,525,133 B1 * | 2/2003 | Wideman et al. ............. 524/848 |
| 2005/0209413 A1 | 9/2005 | Labauze et al. |
| 2006/0004138 A1 | 1/2006 | Mathieu et al. |
| 2006/0167160 A1 | 7/2006 | Nakagawa et al. |
| 2008/0009564 A1 | 1/2008 | Robert et al. |

FOREIGN PATENT DOCUMENTS

| WO | 2002/072689 A1 | 9/2002 |
| WO | 2004/013221 A1 | 2/2004 |
| WO | 2004/022644 A1 | 3/2004 |

OTHER PUBLICATIONS

International Search Report and Written Opinion of the international Searching Authority for PCT/US07/65460, dated May 5, 2008.
Extended European Search Report for EP 07 75 9663, dated Jan. 11, 2011.

* cited by examiner

Primary Examiner — Ling Choi
Assistant Examiner — Lanee Reuther
(74) Attorney, Agent, or Firm — Frank J. Campigotto

(57) ABSTRACT

A cross-linkable or cross-linked rubber composition having a diene rubber selected from one or more natural rubbers, one or more synthetic rubbers or combinations thereof as well as a petroleum hydrocarbon resin. The petroleum hydrocarbon resin may be characterized as having a number-average molecular weight of between 750 and 1000 g/mole, a glass transition temperature of between 20° C. and 60° C. and a polydispersity index of between 1.8 and 3. Furthermore, the resin has units resulting from the polymerization of dicyclopentadiene and dicyclopentadiene codimers with an olefinic composition. Additionally, the rubber composition may include a reinforcing filler that is selected from an inorganic filler, an organic filler or combinations thereof. The composition is useful as a material for articles that include tire components, such as a tire tread.

15 Claims, No Drawings

TIRE TREAD WITH RESIN

BACKGROUND OF THE INVENTION

1. Field of the Invention

This invention relates generally to rubber compositions and more specifically to tire treads and other articles formed from rubber compositions having modified petroleum hydrocarbon resins.

2. Description of the Related Art

Since fuel economies and the need to preserve the environment have become priorities, it has become more desirable to produce rubber compositions having good mechanical properties and good rheological properties so that they can be processed in the form of rubber compositions useful for the manufacture of various semi-finished products, such as treads, that themselves are then useful for manufacturing tires.

It is often found that one performance characteristic of a tire can be improved by using a new rubber composition within the tire, such as, for example, improving the tire's endurance or its rolling resistance by using a new tread compound. However, it is well known to those having ordinary skill in the art that an improvement in one performance characteristic of a tire is often obtained by allowing a reduction in one or more other performance characteristics of the tire. Therefore there is often a tradeoff between improving one performance characteristic of a tire on the one hand while worsening a different performance characteristic of the tire on the other hand. One example of such a tradeoff may be to utilize a tread material that improves the grip of the tire on dry or damp ground while worsening the wear of the tire.

SUMMARY OF THE INVENTION

A particular embodiment of the present invention includes a cross-linkable or cross-linked rubber composition, the composition having a diene rubber selected from one or more natural rubbers, one or more synthetic rubbers or combinations thereof as well as a petroleum hydrocarbon resin. The petroleum hydrocarbon resin included in the rubber composition may be characterized as having a number-average molecular weight of between 750 and 1000 g/mole, a glass transition temperature of between 20° C. and 60° C. and a polydispersity index of between 1.8 and 3. Furthermore, the resin comprises units resulting from the polymerization of dicyclopentadiene and dicyclopentadiene codimers with an olefinic composition. Additionally, the rubber composition may include a reinforcing filler that is selected from an inorganic filler, an organic filler or combinations thereof.

An additional embodiment of the present invention includes a tire having one or more portions of the tire constructed from the rubber composition having the modified hydrocarbon resin. Such portions may include, for example, the tread of the tire, the sidewall of the tire, the carcass reinforcement of the tire, the undertread of the tire or combinations thereof.

An additional embodiment of the present invention includes a tire having a tread that includes a cross-linkable or cross-linked rubber composition having, in addition to a diene rubber and a reinforcing filler, a petroleum hydrocarbon resin. The petroleum hydrocarbon resin is as discussed above here in the Summary.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include rubber compositions and articles made of the rubber compositions. Particular embodiments of the present invention include tires and treads on the tires that are made of the rubber compositions. Each of the compositions and articles made therefrom include a petroleum hydrocarbon resin.

A particular embodiment of the present invention includes a cross-linkable or cross-linked elastomer or rubber composition. The rubber composition comprises a diene rubber, a reinforcing filler and a modified petroleum hydrocarbon resin that is formed by the polymerization of dicyclopentadiene and dicyclopentadiene codimers with an olefinic composition. Advantageously, and quite surprisingly, a tread made of such an elastomer or rubber composition can be characterized as having improved performance properties including improved wear resistance (i.e., endurance) and grip. Also advantageously and quite surprisingly, these improved performance properties are obtained without a corresponding significant decrease in other performance properties.

Particular embodiments of the modified petroleum hydrocarbon resin that is included in the rubber composition and that provides the improved tire performance properties may be further characterized as having a number-average molecular weight (Mn) of between 750 and 1000 g/mole with other embodiments having an Mn of between 775 and 950 or between 800 and 900. Embodiments of the modified resin may further be characterized as having a glass transition temperature (Tg), as determined by a differential scanning calorimeter, of between 20 and 60° C. with other embodiments having a Tg of between 20 and 40° C. and others between 25 and 35° C. The polydispersity index (Ip) of particular embodiments of the resin is between 1.8 and 3 with others having an Ip of between 1.9 and 2.7 and others of between 2 and 2.5. As known to those having ordinary skill in the art, the polydispersity index is defined as the ratio of the weight-average molecular weight to the number-average molecular weight.

Although not limiting the invention, particular embodiments of the invention may be characterized as having a resin with an iodine number of between 90 and 130 as determined by the well known Wijs method. Particular embodiments of the resin may further be characterized as having a resin with an aromatic content of between about 0% and 10% or between about 0% and 2% or between 0.1 and 1%. Other particular embodiments of the resin have an aromatic content of less than 1% or 0%. Particular embodiments of the modified resin have an aliphatic content of greater than about 80% or greater than 95%. In other embodiments, the modified resin is characterized as being at or near 100% aliphatic or greater than about 98% or 99% aliphatic. Ethylenic content is typically less than about 1.5% or in other embodiments, between about 0.1% and 1.3% The content of the resin may be determined by using NMR techniques. The inventors have used a Beaker $^1$HNMR having a magnet size of 250 MHz for determining the aromatic, aliphatic and olefinic or ethylenic content of the resin.

The dicyclopentadiene, dicyclopentadiene codimers and olefinic petroleum hydrocarbon feedstock composition that is polymerized to form the modified petroleum hydrocarbon resin includes between about 50% and 70% of the total feedstock as dicyclopentadiene, between about 5% and 30% or between about 10% and 20% of the total feedstock as dicyclopentadiene codimers such as, for example, methylcyclopentadiene dimer and other similar codimers, cyclopentadiene/methylcyclopentadiene and cyclopentadiene/1,3-butadiene codimers and other similar codimers. Other embodiments of the modified resin may be formed from a polymerization feedstock that includes a content of the dicyclopentadiene and the dicyclopentadiene codimers of between about 60% and 75% or between about 55% and 75%.

The remaining petroleum hydrocarbon feedstock composition, between about 25% and 45% or between about 20% and 40% or between about 25% and 30% is made up of olefinic compositions. In particular embodiments, the olefin compositions may be characterized as being selected from olefins ranging between $C_8$ and $C_{18}$ olefins or combinations thereof, including both aromatic and aliphatic olefin hydrocarbon compositions. Other embodiments may be characterized as having olefin compositions selected from olefins ranging between $C_9$ to $C_{14}$ olefins or combinations thereof. For example, styrenes such as alpha methyl styrene and vinyl toluene styrenes may be included in the olefinic portion of the polymerization feedstock. It is noted that ranges used herein have the beginning point and ending point of the range included in the range; e.g., the range "between $C_9$ to $C_{14}$ olefins" includes both $C_9$ and $C_{14}$ olefins as well as all other olefins in the range therebetween. The petroleum hydrocarbon resins useful for embodiments of the present invention are available from Neville Chemical of Neville Island, Pa. under the trade name of TR-2700 series resins.

The modified resins described above are added to elastomer or rubber compositions. The amount of the modified resin that is added to the rubber compositions is not meant to be limited but may be added, for example, in a quantity up to about 40 parts by weight of the modified resin per hundred parts by weight of the elastomer or rubber (phr). Particular embodiments may include rubber compositions having between 5 and 30 phr of the modified resin while other embodiments may have between 12 and 20 phr of the modified resin. In one embodiment, about 16 phr of the modified resin is added to the rubber composition.

The diene rubber included in the rubber composition of particular embodiments of the present invention is generally defined as an elastomer resulting at least in part (i.e. a homopolymer or a copolymer) from diene monomers (monomers bearing two double carbon-carbon bonds, whether conjugated or not). "Essentially unsaturated" diene elastomer is understood here to mean a diene elastomer resulting at least in part from conjugated diene monomers, having a content of members or units of diene origin (conjugated dienes) which is greater than 15 mol %. Thus, for example, diene elastomers such as butyl rubbers or copolymers of dienes and of alpha-olefins of the EPDM type do not fall within this definition, and may on the contrary be described as "essentially saturated" diene elastomers (low or very low content of units of diene origin which is always less than 15 mol %). Within the category of "essentially unsaturated" diene elastomers, "highly unsaturated" diene elastomer is understood to mean in particular a diene elastomer or rubber having a content of units of diene origin (conjugated dienes) which is greater than 50%.

These general definitions being given, the person skilled in the art of tires will understand that the present invention is used first and foremost with highly unsaturated diene elastomers, in particular with any homopolymer obtained by polymerization of a conjugated diene monomer having 4 to 12 carbon atoms and/or any copolymer obtained by copolymerization of one or more conjugated dienes with each other or with one or more vinyl-aromatic compounds having 8 to 20 carbon atoms.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerization conditions used, in particular of the presence or absence of a modifying and/or randomising agent and the quantities of modifying and/or randomising agent used. The elastomers may, for example, be block, statistical, sequential or microsequential elastomers, and may be prepared in dispersion or in solution; they may be coupled and/or starred or alternatively functionalised with a coupling and/or starring or functionalising agent.

Particular embodiments of the present invention use polybutadienes, including those having a content of 1,2-units between 4% and 80%, or those having a content of cis-1,4 [bonds] of more than 80%, polyisoprenes, butadiene-styrene copolymers, including those having a styrene content of between 5% and 50% by weight and more particularly, between 20% and 40%, a content of 1,2-bonds of the butadiene fraction of between 4% and 65%, and a content of trans-1,4 bonds of between 20% and 80%, butadiene-isoprene copolymers including those having an isoprene content of between 5% and 90% by weight and a glass transition temperature ("Tg"—measured in accordance with ASTM Standard D3418-03) of between −40° C. and −80° C., isoprene-styrene copolymers and in particular those having a styrene content of between 5% and 50% by weight and a Tg of between −25° C. and −50° C. In the case of butadiene-styrene-isoprene copolymers, those that are suitable include those having a styrene content of between 5% and 50% by weight and more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene-styrene-isoprene copolymer having a Tg of between −20° C. and −70° C.

The diene rubber of the composition according to particular embodiments of the present invention may be selected from the group of highly unsaturated diene elastomers that include polybutadienes (BR), synthetic polyisoprenes (IR), natural rubber (NR), butadiene copolymers, isoprene copolymers and mixtures thereof.

Such copolymers may, in other embodiments, be selected from the group that includes butadiene-styrene copolymers (SBR), butadiene-isoprene copolymers (BIR), isoprene-styrene copolymers (SIR), isoprene-butadiene-styrene copolymers (SBIR) and mixtures thereof.

The compositions of the treads of the invention may contain a single diene elastomer or a mixture of several diene elastomers, the diene elastomer(s) possibly being used in association with any type of synthetic elastomer other than a diene one, or even with polymers other than elastomers, for example thermoplastic polymers.

Particular embodiments of the rubber composition further include a reinforcing filler, such filler being inorganic, organic or combinations thereof. The inorganic reinforcing filler is to be understood here to mean any inorganic or mineral filler, whatever its colour and its origin (natural or synthetic), also referred to as "white" filler or sometimes "clear" filler in contrast to carbon black. Such inorganic filler is capable, on its own, without any other means than an intermediate coupling agent, of reinforcing a rubber composition intended for the manufacturing of a tire tread, i.e., is capable of replacing a conventional tire-grade carbon black (for treads) in its reinforcement function. Such fillers may include, for example, a filler of the siliceous or aluminous type, or a mixture of these two types of fillers.

The silica ($SiO_2$) used may be any reinforcing silica known to the person skilled in the art. Particular embodiments include any precipitated or pyrogenic silica having a BET surface area and a specific CTAB surface area both of which are less than 450 $m^2/g$, or from 30 to 400 $m^2/g$. Highly dispersible precipitated silicas (referred to as "HD") are included in particular embodiments, in particular for those embodiments used for the manufacturing of tires having a low rolling resistance: "Highly dispersible silica" is understood in known manner to mean any silica having a substantial ability to disagglomerate and to disperse in an elastomeric matrix, which can be observed in known manner by electron or optical microscopy on thin sections. As non-limitative examples of such preferred highly dispersible silicas, mention may be made of the silicas BV3380 and Ultrasil 7000 from Degussa, the silicas Zeosil 1165 MP and 1115 MP from Rhodia, the silica Hi-Sil 2000 from PPG, the silicas Zeopol 8715 or 8745 from Huber, and treated precipitated silicas such as, for example, the aluminium-"doped" silicas.

The reinforcing alumina ($Al_2O_3$) used in particular embodiments is a highly dispersible alumina having a BET surface area from 30 to 400 $m^2/g$, or between 60 and 250 $m^2/g$, an average particle size at most equal to 500 nm, or at most equal to 200 nm. Non-limitative examples of such reinforcing aluminas are in particular the aluminas A125 or CR125 (from Baïkowski), APA-100RDX (from Condéa), Aluminoxid C (from Degussa) or AKP-G015 (Sumitomo Chemicals). The invention can also be implemented by using as reinforcing inorganic filler the specific aluminium (oxide-) hydroxides.

The physical state in which the reinforcing inorganic filler is present is immaterial, whether it is in the form of a powder, micro-beads, granules, balls or any other densified form.

Of course, "reinforcing inorganic filler" is also understood to mean mixtures of different reinforcing inorganic fillers, in particular of highly dispersible siliceous and/or aluminous fillers such as described above.

The amount of reinforcing inorganic filler may be between 60 and 120 phr, or between 70 and 100 phr approximately, in particular when the tread is intended for a passenger-car tire. The person skilled in the art will readily understand that the optimum will be different according to the nature of the reinforcing inorganic filler used and according to the type of tire in question, for example a tire for a motorcycle, passenger vehicle or alternatively for a utility vehicle such as a van or a heavy vehicle. The amount of reinforcing inorganic filler is not meant to be limited and may be at any quantity suitable for a particular purpose.

Carbon black, which is an organic filler, may be used as a sole filler or in combination with one or more inorganic fillers. The compounding amount of the carbon black in the elastomer composition is not limited. In particular embodiments of the present invention, the compounding amount of the carbon black may be up to about 200 phr or between about 10 and about 180 phr. Other useful ranges of carbon black loading may include between 30 and 120 phr in some embodiments of the present invention and between 50 and 100 phr.

Suitable carbon blacks are any carbon blacks, in particular the blacks of the type HAF, ISAF and SAF, which are conventionally used in tires, and particularly in treads. Non-limitative examples of carbon blacks include, for example, the N115, N134, N234, N330, N339, N343, N347, N375 and HV3396 carbon blacks.

In addition to the elastomer, modified resin and reinforcement filler, particular embodiments of the rubber composition may further include all or part of the additives usually used in sulphur-cross-linkable diene rubber compositions intended for the manufacturing of treads or other rubber articles, such as, for example, plasticizers, pigments, protective agents of the type antioxidants, antiozonants, a cross-linking system based either on sulphur or on sulphur and/or peroxide and/or bismaleimide donors, vulcanisation accelerators, vulcanisation activators, extender oils, and so forth. There may also be associated with the reinforcing inorganic filler, if necessary, a conventional non-reinforcing white filler, such as for example particles of clay, bentonite, talc, chalk, kaolin or titanium oxides.

For example, particular embodiments of the rubber composition may include at least one plasticizing oil extracted from petroleum of paraffinic, aromatic or naphthenic type, in a quantity of between 0 phr and 60 phr or alternatively between 0 phr and 35 phr or between 0 and 30 phr or between 0 and 20 phr or between 0 and 15 phr or between 0 and 10 phr. Advantageously, the rubber composition may be totally devoid of the plasticizing oil extracted from petroleum.

Particular embodiments of the present invention include a tread that is intended for passenger-car or light truck tires but the invention is not limited only to such tires. It is noted that the particular embodiments of the tread of the present invention are intended to be fitted on motor vehicles or non-motor vehicles such as bicycles, motorcycles, racing cars, industrial vehicles such as vans, heavy vehicles such as buses and trucks, off-road vehicles such as agricultural, mining, and construction machinery, aircraft or other transport or handling vehicles.

The rubber composition disclosed herein may be used for various rubber products such as a tread compound, undertread compound, sidewall compound, wire skim compound, inner liner compound, bead, apex, any compound used in a tire carcass, including carcass reinforcement and in other components for tires, industrial rubber products, seals, timing belts, power transmission belting, and other rubber goods. As such, the present invention includes products made from the rubber composition disclosed herein.

The invention is further illustrated by the following examples, which are to be regarded only as an illustration and not delimitative of the invention in any way. The properties of the compositions disclosed in the example are evaluated as described below.

Molecular Weights of the Modified Resins—The number-average molecular weight (Mn) and the weight-average molecular weight (Mw) are determined by size exclusion chromatography (SEC). Size exclusion chromatography makes it possible physically to separate macromolecules according to their size in the swollen state in columns filled with a porous stationary phase. The macromolecules are separated by their hydrodynamic volume, the bulkiest being eluted first. Although not an absolute method, SEC does enable an assessment to be made of the molecular weight distribution of the resins. On the basis of commercially available standards of polystyrene of low molecular weight (of between 104 and 90000 g/mol), the various number-average Mn and weight-average Mw molecular weights are determined and the polydispersity index Ip calculated. Ip is calculated as the ratio of Mw/Mn.

The following is an acceptable SEC method. Each sample of the modified resin is solubilized in tetrahydrofuran, at a concentration of about 1 g/l. The apparatus used is a chromatograph "WATERS model Alliance 2690". The elution solvent is tetrahydrofuran (mobile phase), the flow rate is 1 ml/min., the temperature of the system is 35° C. and the duration of analysis is 40 mm. A set of three columns in series, having the respective trade names "WATERS type STYRAGEL HR4E" (mixed-bed column), "WATERS type STYRAGEL HR1" (of a porosity of 100 Angstrom) and "WATERS STYRAGEL HR0.5" (of a porosity of 50 Angstrom) is used for the stationary phase.

The injected volume of the solution of each resin sample is 100 µl. The detector is a "WATERS model 2410" differential refractometer and the chromatographic data processing software is the "WATERS MILLENNIUM" (version 3-2) system.

Glass transition temperature (Tg) for resins—The Tg for resins was determined by differential scanning calorimeter (DSC) as provided by ASTM D3418-03/E1356-03. The inventors used a Mettler DSC Model Number 822 for determining the Tg.

Mooney viscosity—The Mooney viscosity ML(1+4) at 100° C. was measured in accordance with Standard ASTM D 1646 of 1999.

Shore A hardness—The Shore A hardness was measured in accordance with Standard ASTM D 2240 of 1997.

Modulus of Elongation—The moduli of elongation were measured at 100% (M100) at a temperature of 23° C. in accordance with ASTM D412 (1998) on ASTM C test pieces. These are true secant moduli in MPa, that is to say the secant moduli calculated reduced to the real cross-section of the test piece at the given elongation.

Hysteresis Losses (HL)—Hysteresis losses are measured in percent by rebound at 60° C. at the sixth impact in accordance with the following equation:

$$HL(\%) = 100\{(W_0 - W_1)/W_1\},$$

wherein $W_0$ is the energy supplied and $W_1$ is the energy restored.

Glass transition temperatures (Tg) for rubber elastomers—The measurements of Tg for the rubber compositions incorporating the modified resins, dynamic measurements were carried out at a frequency of 10 Hz and at two different values of stresses (0.2 MPa and 0.7 MPa), which "MDC" measurements were carried out in accordance with ISO Standard 4664 (the mode of deformation being shearing and the test pieces being cylindrical).

Measurement of the Performance of the Tires—Relative performance indices, relative to a reference index 100 characterizing a "control" tire (a performance index greater than this base 100 indicating a performance superior to that of the corresponding "control" tire), were used.

The rolling resistance of each of the tires tested was measured by running on a test drum, at an ambient temperature of 25° C., under a load of 530 kg and at a speed of 80 km/h, the internal pressure of the tire being 2.6 bar.

The wear resistance or endurance of each tire was determined by means of a relative wear index which is a function of the height of rubber remaining, after running on a winding road circuit, at an average speed of 77 km/h and until the wear reaches the wear indicators located in the grooves in the treads. This relative wear index was obtained by comparing the height of rubber remaining on a tread according to the invention with the height of rubber remaining on a "control" tread, which by definition has a wear index of 100.

The grip of each tire tested was evaluated by measuring braking distances in "ABS" braking mode, both on dry ground and on wet ground. More precisely, the braking distance in "ABS" mode was measured, on a dry surface, going from a speed of 60 km/h to 0 km/h and, on wet ground (with about 1.3 mm of surface water), going from a speed of 50 km/h to 0 km/h.

Example 1

Elastomer formulations were prepared using the components shown in Table 1 and using procedures well known to one having ordinary skill in the art. The amount of each component making up the elastomer formulations shown in Table 1 are provided in parts per hundred parts by weight (phr) of the elastomer. The curative, antioxidant and antiozonant package included ZnO, sulfur, accelerator, stearic acid, 6PPD and TMQ and were added in normal amounts, all of which are known to those having ordinary skill in the art.

As shown in Table 1, the witness formulation contained no modified resin. Table 2 provides the physical characteristics of the modified resins that were added to the E1 and E2 elastomer formulations. These resins are available from Neville Chemical, Neville Island, Pa. as the TR-2700 series of resins.

The elastomer formulations were prepared by mixing the components given in Table 1, in a Banbury mixer operating at 55-65 RPM until a temperature of between 155 and 170° C. was reached. Vulcanization was effected at 150° C. for 60 minutes. The formulations were then tested to measure their physical properties.

TABLE 1

Physical Properties of Elastomer Formulations Having the Modified Resin

|  | Witness | E1 | E2 |
|---|---|---|---|
| Elastomer Composition |  |  |  |
| Polybutadiene rubber | 20 | 20 | 20 |
| Styrene-butadiene rubber | 80 | 80 | 80 |
| Carbon black (N234), phr | 75 | 77 | 77 |
| Oil, phr | 47 | 26 | 26 |
| Modified Resin, phr | 0 | 16* | 16* |
| Curative, antioxidant, antiozonant package, phr | 11.1 | 11.2 | 11.3 |
| Measured Properties |  |  |  |
| Mooney Viscosity ML (1 + 4) 100° C. | 49.0 | 47.8 | 47.4 |
| Hysteresis Loss @ 60° C. | 31.5 | 39.0 | 39.1 |
| Modulus 100% @ 23° C. (MPa) | 1.6 | 1.5 | 1.5 |
| Shore A | 61.6 | 61.3 | 61.4 |
| Dynamic Properties at 10 Hz, 0.2 Mpa and 0.7 MPa |  |  |  |
| Tg (metravib at 0.2 MPa), ° C. | −36.0 | −38.4 | −38.4 |
| Tg (metravib at 0.7 MPa), ° C. | −24.7 | −24.6 | −26.1 |

*See, Table 2.

TABLE 2

Physical Properties of Modified Resins

| Modified Resin Properties | E1 | E2 |
|---|---|---|
| Mn, g/mole | 835 | 808 |
| Mw, g/mole | 1979 | 1882 |
| Ip | 2.37 | 2.33 |
| Tg, °C. | 27 | 33 |

Example 2

To determine performance of tires having treads made out of the elastomer formulations of Example 1, tires were made having treads made of these elastomer formulations. The tires were P225/60R16 tires. The testing results are shown in Table 3.

The testing for the wear resistance was measured on a 2003 Intrepid while the testing for grip was measured on a 2006 Pontiac Grand Prix.

TABLE 3

Tire Performance Results

| Tire Performance Test | Witness | E1 | E2 |
|---|---|---|---|
| Wear Resistance | 100 | 108 | 108 |
| Grip, Dry Braking Distance | 100 | 100 | 99 |
| Grip, Wet Braking Distance | 100 | 110 | 110 |
| Rolling Resistance | 100 | 95 | 95 |

As shown in Table 3, the tires having treads made from the rubber formulations containing the modified resin have significantly increased wear resistance and grip properties with little decrease in rolling resistance.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A cross-linkable or cross-linked rubber composition, comprising:
    a diene rubber selected from one or more natural rubbers, one or more synthetic rubbers or combinations thereof;
    a reinforcing filler selected from an inorganic filler, an organic filler or combinations thereof; and
    a petroleum hydrocarbon resin having a number-average molecular weight of between 750 and 1000 g/mole, a glass transition temperature of between 20° C. and 40° C. and a polydispersity index of between 2.0 and 2.5, wherein the resin comprises units resulting from the polymerization of dicyclopentadiene and dicyclopentadiene codimers with an olefinic composition of C8 through C18 olefins.

2. The rubber composition of claim 1, wherein the one or more synthetic rubbers are selected from styrene butadiene rubber, polybutadiene rubber, polyisoprene rubber, or combinations thereof.

3. The rubber composition of claim 1, wherein the diene rubber is natural rubber, polybutadiene or combinations thereof.

4. The rubber composition of claim 1, wherein the reinforcing filler is selected from carbon black, silica or combinations thereof.

5. The rubber composition of claim 1, wherein the number-average molecular weight of the petroleum hydrocarbon resin is between 775 and 950 g/mole.

6. The rubber composition of claim 1, wherein the glass transition temperature of the petroleum hydrocarbon resin is between 25° C. and 35° C.

7. The rubber composition of claim 1, wherein the petroleum hydrocarbon resin has an iodine number of between 90 and 130.

8. The rubber composition of claim 1, wherein the aromatic content of the petroleum hydrocarbon resin is between 0% and 1%.

9. The rubber composition of claim 1, wherein the aliphatic content of the petroleum hydrocarbon resin is between 99% and 100%.

10. The rubber composition of claim 1, wherein the rubber composition comprises:
    between 5 and 40 parts by weight of the petroleum hydrocarbon resin per 100 parts by weight of the diene rubber.

11. The rubber composition of claim 1, further comprising:
    between 0 and 30 parts by weight of a petroleum extracted oil per 100 parts by weight of the diene rubber.

12. A tire, comprising:
    a tread, the tread comprising a cross-linkable or cross-linked rubber composition, the rubber composition comprising:
    a diene rubber selected from one or more natural rubbers, one or more synthetic rubbers or combinations thereof;
    a reinforcing filler; and
    a petroleum hydrocarbon resin having a number-average molecular weight of between 750 and 1000 g/mole, a glass transition temperature of between 20° C. and 40° C. and a polydispersity index of between 2 and 2.5, wherein the resin comprises units resulting from the polymerization of dicyclopentadiene and dicyclopentadiene codimers with an olefinic composition of C8 through C18 olefins.

13. The tire of claim 12, wherein the one or more synthetic rubbers are selected from styrene butadiene rubber, polybutadiene rubber, polyisoprene rubber, or combinations thereof.

14. The tire of claim 12, wherein the number-average molecular weight of the petroleum hydrocarbon resin is between 775 and 950 g/mole.

15. The tire of claim 12, wherein the rubber composition further comprises:
   between 0 and 30 parts by weight of a petroleum extracted oil per 100 parts by weight of the diene rubber.

\* \* \* \* \*